July 18, 1950     K. SUMMERS     2,516,028
TRAILER HITCH
Filed Oct. 31, 1947
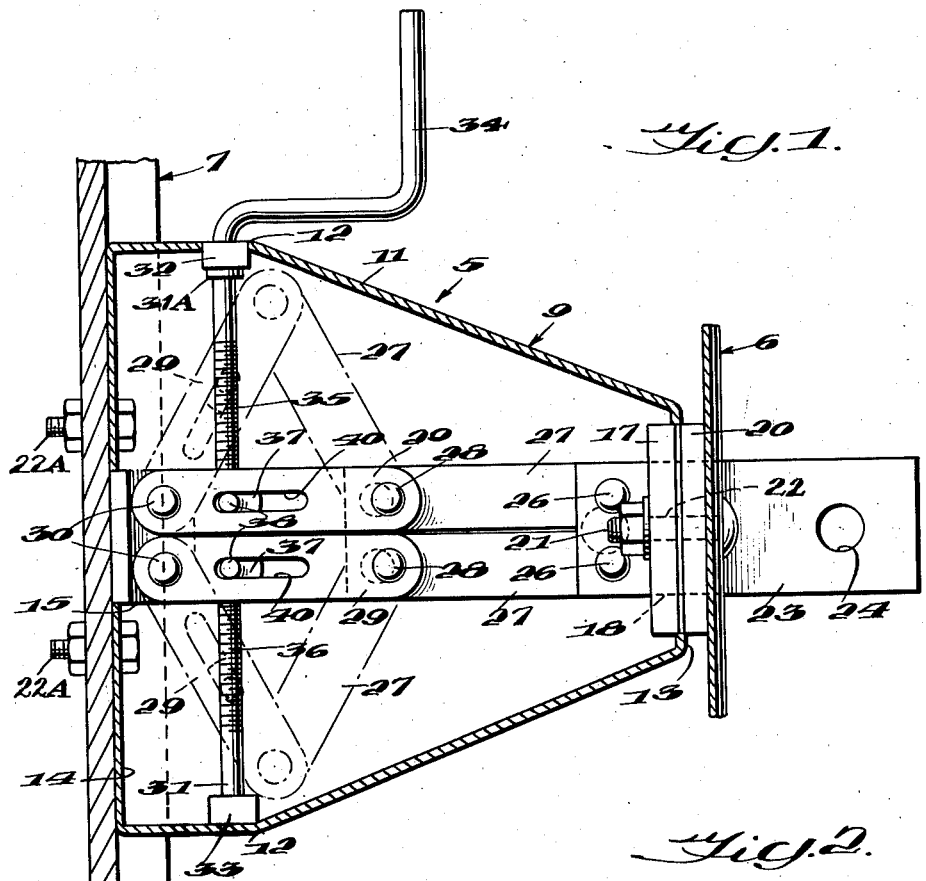
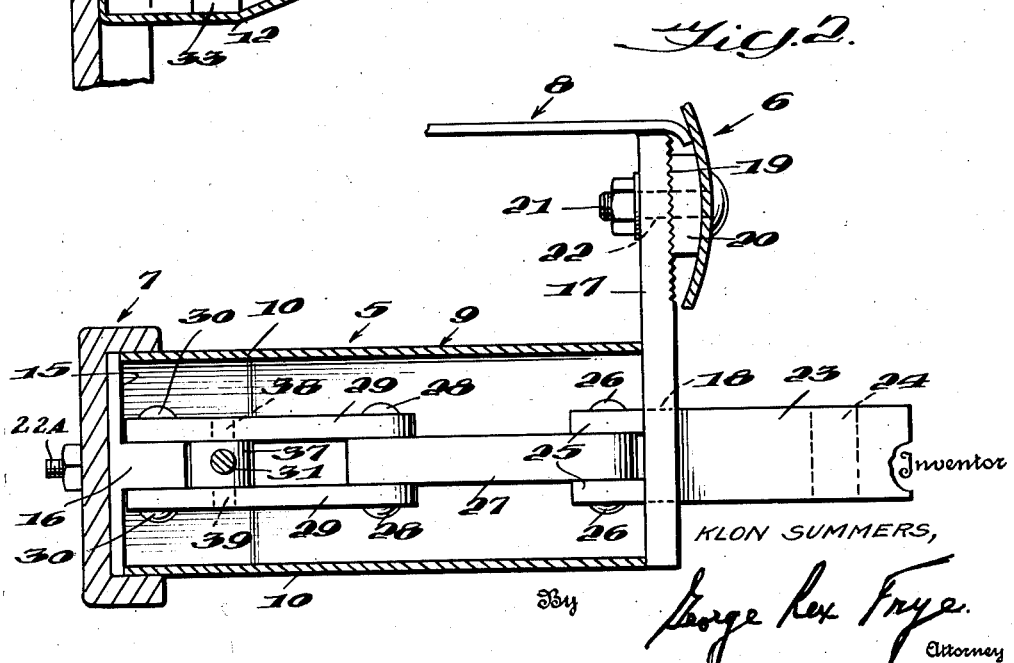
Inventor
KLON SUMMERS,
By George Rex Frye.
Attorney Patented July 18, 1950

2,516,028

UNITED STATES PATENT OFFICE 2,516,028

TRAILER HITCH

Klon Summers, Anadarko, Okla.

Application October 31, 1947, Serial No. 783,356

10 Claims. (Cl. 280—33.44)

This invention relates to an improved trailer hitch, especially although not necessarily, for installation on passenger automobiles for use in pulling utility trailers, boat trailers, and the like, the primary object of the invention being to provide a trailer hitch which can be readily installed in an out of the way position between a rear chassis frame cross member and the rear bumper of an automobile, and whose tongue or drawbar can be easily projected to extend rearwardly beyond the bumper for connection with a trailer or retracted to an out of the way position forward of the bumper when not in use.

Another important object of the invention is the provision of a trailer hitch of the character indicated above whose mechanism can be completely enclosed so as to have no functional parts exposed to view and to injury and deterioration due to the action of the elements and accumulation of mud and other debris thereon, except a handle which is provided to be operated to project and retract the tongue or drawbar.

Another important object of the invention is to provide a trailer hitch of the character indicated above whose construction and manner of assoiation with the rear chassis cross member and the rear bumper of the automobile affords a structurally strong and functionally sound trailer hitch arrangement despite its relatively light weight and compact form.

Another important object of the invention is to provide an enclosed trailer hitch of the character indicated above which can be installed in position between the rear bumper of the automobile and a rear chassis cross member, beneath the splash pan found in this location on many automobiles, without in most cases any substantial disturbance of the splash pan, in which arrangement the trailer hitch is additionally concealed from view and protected by the splash pan.

Other important objects and advantages of this invention will be apparent from the following description and accompanying drawings, wherein, for purposes of illustration, a presently preferred embodiment of the invention is set forth.

In the drawings:

Figure 1 is a diagrammatic view of a trailer hitch arrangement in accordance with the present invention, with the top portion of the casing removed and the mechanism shown in top plan, the tongue or drawbar being shown in rearwardly projected position in full lines, and in forwardly retracted position in dotted lines, and Figure 2 is a vertical longitudinal section taken through Figure 1 on a line at one side of the mechanism with the tongue or drawbar in the same rearwardly projected position.

Referring in detail to the drawings, the numeral 5 generally designates the herein illustrated embodiment of the invention, here shown as installed between the rear automobile bumper 6 and a rear chassis frame cross member 7, and beneath the splash pan 8, if the vehicle is provided with a splash pan.

The trailer hitch 5 comprises a relatively flat horizontal metal casing 9 having similar parallel upper and lower walls 10, 10, sidewalls 11, 11 which converge rearwardly from the forward points 12, 12 to meet the ends of the relatively short rear wall 13, with the relatively long front wall 14 joined to the forward ends of the sidewalls. A portion at the middle of the front wall involves a heavier gauge metal fitting 15 which includes a rearwardly projecting bearing lug 16 positioned substantially midway between the upper and lower walls 10, 10. A portion at the middle of the shorter rear wall 13 of heavier gauge metal, and like the fitting 15, preferably extending from top to bottom of the casing 9, is arranged to extend above the casing 9 to form a heavy upright 17 for engaging the automobile bumper 6. The lower part of the upright 17 is formed with a drawbar bearing opening 18, while the rearward face of the upper end of the upright 17 is serrated, as indicated at 19, for nonslip engagement with a washer 20 which conformably engages the bumper 6, the parts being assembled together by a bolt 21 on the bumper passing through the washer 20 and a bolt hole 22 provided in the upper part of the upright 17.

The front end of the trailer hitch is secured by any suitable means, such as bolts 22A, to the rear transverse automobile frame member 7, with the bolts in this instance passing forwardly through the casing front wall 14 at points close to the opposite sides of the fitting 15, and being suitably engaged with the frame member 7.

It will be noted that the above described construction and arrangement of the trailer hitch 5 permits of its being installed beneath and hidden by the splash pan 8, which is found on many automobiles, without necessarily requiring either removing the splash pan for the installation or permanently removing or displacing the splash pan where it is necessary to remove it to facilitate installation of the trailer hitch.

The mechanism of the trailer hitch comprises the heavy rectangular cross section tongue or drawbar 23 which is slidably extensible and retractible through the conforming bearing opening 18 in the heavy upright 17 on the rear of the casing 9. The rear end of the drawbar has a trailer connecting opening 24, and its front end is bifurcated to provide upper and lower bearing lugs 25, which are vertically traversed by two symmetrically laterally spaced pivot pins 26, 26, to which are pivoted between the lugs 25, 25, the rearward ends of the single secondary links 27, 27, which are positioned in the same horizontal plane.

The forward ends of the secondary links 27, 27 are pivoted on vertical pivots 28, 28 which traverse them and also the rearward ends of related pairs of vertically spaced upper and lower primary links 29, 29, with the forward ends of the secondary links confined between the related upper and lower primary links, as shown in Figure 2. The forward ends of the primary links are pivotally anchored by symmetrically laterally spaced vertical pivots 30, 30 on the bearing lug 16 of the fitting 15.

For projecting and retracting the drawbar 23, through operation of the primary and secondary links, and holding the drawbar in a desired extreme or intermediate position, the crankshaft 31 is provided, which is mounted on bearings 32 and 33, respectively, on opposite sidewalls of the casing 9, with one end of the crankshaft having an offset handle 34 projecting laterally therefrom, as shown in Figure 1. A retaining collar 31A on the crankshaft engaging the bearing 32 may be employed to retain it in place within the casing 9.

Intermediate its ends the crankshaft 31 has oppositely screw threaded portions 35 and 36, respectively, upon which are similar but oppositely threaded runners 37, 37 which conformably and rotatably fit between the upper and lower primary link pairs of links, and have upper and lower pins 38 and 39, respectively, which slidably and rotatably engage in longitudinal slots 40 formed in the paired upper and lower primary links, with the result that when the crank handle 34 is turned in one direction the drawbar 23 will be projected rearwardly, and when turned in the opposite direction, retracted forwardly. It will also be observed that while the close frictional interengagement of the mechanism parts and their angular relationship, as well as the screw-threaded relation of the runners 37, 37 and the crankshaft 31, do not prevent easy and accurate adjustment of the drawbar 23 in response to manual rotation of the crank handle 34, they do preclude unwanted movement of the drawbar 23 in service, thereby reducing noise and wear in the parts and affording efficient and safe traction for a trailer connected thereto. It will also be noted that while the drawbar 23 is in its extreme rearward position, the secondary links 27 and the primary links 29 are in longitudinal alignment and parallelism, with the pins 38 and 39 of the runners 37, 37 positioned near but free of the forward ends of the slots 40, 40, so that any forward thrust, such as would be exerted by a trailer upon the drawbar 23 is transmitted directly to the fitting 15 and hence to the chassis frame cross member 7; and that any rearward pull upon the drawbar is exerted through the close fitting pivots upon the fitting 15 and hence upon the chassis frame cross member 7. Further, the forward thrust and the rearward pull are also exerted directly upon the automobile rear bumper 6 by virtue of the connection of the upright 17 therewith. Hence the device of the invention provides an essentially rigid trailer hitch which is not subject to unwanted movement relative to the automobile, but which nevertheless has adequate shock absorbing characteristics by reason of the relatively yielding character of the rear bumper 6 and the chassis frame cross member 7.

While it is apparent that the illustrated embodiment herein described is well calculated to adequately fulfill the objects and advantages herein stated, it is to be understood that the invention is susceptible to variation, modification and change within the spirit and scope of the subjoined claims.

What is claimed is:

1. A trailer hitch for an automobile having a rear chassis cross member and a rear transverse bumper spaced rearwardly from said cross member, said trailer hitch comprising a body interposed between said cross member and said bumper, means for securing a forward end portion of said body to said cross member, an upright on the rear of said body, including a drawbar bearing on the lower part of said upright, means for securing an upper part of said upright to said bumper bar, a horizontal drawbar working through said bearing opening below said bumper, toggle lever means operatively connected between the forward end of said drawbar and said forward end portion of said body, and screw means on said body and operatively connected with said toggle lever means for operating the same for projecting said drawbar rearwardly and for retracting said drawbar forwardly.

2. A trailer hitch for an automobile comprising a body adapted to be mounted on the rear of the automobile, said body being provided with a bearing opening, a drawbar slidably mounted on said body for movement through said bearing opening, and operating mechanism comprising a pair of toggle levers pivotally connected at one end to the forward end of said drawbar and pivotally anchored at the opposite end to said body, an operating shaft mounted on said body transversely with respect to said drawbar and formed with a screw threaded portion, a runner threaded on said screw threaded portion and having a pin rotatably and slidably engaging a slot formed in one of said pair of toggle levers, and handle means for rotating said shaft in one direction to retract said drawbar forwardly and in the opposite direction to project said drawbar rearwardly.

3. A trailer hitch for an automobile comprising a body adapted to be mounted on the rear of the automobile, said body being provided with a bearing opening, a drawbar slidably mounted on said body for movement through said bearing opening, and operating mechanism comprising a pair of toggle levers pivotally connected at one end to the forward end of said drawbar and pivotally anchored at the opposite end to said body, an operating shaft mounted on said body transversely with respect to said drawbar and formed with a screw threaded portion, a runner threaded on said screw threaded portion and having a pin rotatably and slidably engaging a slot formed in one of said pair of toggle levers, and handle means for rotating said shaft in one direction to retract said drawbar forwardly and in the opposite direction to project said drawbar rearwardly, said body comprising a casing enclosing said operating mechanism.

4. A trailer hitch for an automobile comprising a body adapted to be mounted on the rear of the automobile, said body being provided with a bearing opening, a drawbar slidably mounted on said body for movement through said bearing opening, and operating mechanism comprising a pair of toggle levers pivotally connected at one end to the forward end of said drawbar and pivotally anchored at the opposite end to said body, an operating shaft mounted on said body transversely with respect to said drawbar and formed with a screw threaded portion, a runner threaded on said screw threaded portion and having a pin rotatably and slidably engaging a slot formed in one of said pair of toggle levers, and handle means for rotating said shaft in one direction to retract said drawbar forwardly and in the opposite direction to project said drawbar rearwardly, said body comprising a casing enclosing said operating mechanism and formed in its rear wall with said drawbar bearing opening, with said handle means projecting laterally from said casing.

5. A trailer hitch for an automobile comprising a body adapted to be mounted on the rear of the automobile, said body being formed in its rear end with a bearing opening, a drawbar slidably mounted on said body for forward and rearward movement through said bearing opening, and drawbar operating mechanism comprising two laterally distinct sets of toggle levers pivotally connected at their opposite ends to the front end of said body and to the forward end of said drawbar at points transversely spaced with respect to said drawbar, a rotary operating shaft mounted transversely on said body and having axially spaced and oppositely screw threaded portions, correspondingly threaded runners on said oppositely screw threaded portions having pins rotatably and slidably confined in slots formed longitudinally in a related lever of each set of toggle levers, and handle means for turning said operating shaft in one direction so as to produce laterally outward movement of said related levers with respect to the drawbar whereby said drawbar is retracted forwardly, and for rotating said operating shaft in the opposite direction so as to produce laterally inward movement of said related levers with respect to the drawbar whereby said drawbar is projected rearwardly through said bearing opening.

6. A trailer hitch for an automobile comprising a body adapted to be mounted on the rear of the automobile, said body being formed in its rear end with a bearing opening, a drawbar mounted on said body for forward and rearward endwise movement through said bearing opening, and drawbar operating mechanism on said body comprising two similar sets of toggle means each comprising a pair consisting of a secondary lever and a primary lever, said secondary lever being pivoted at its rear end to the forward end of said drawbar and at its forward end to the rear end of said primary lever and said primary lever having its forward end pivotally anchored to the forward end of said body, a rotary operating shaft mounted transversely on said body in the region of said primary levers, said shaft having axially spaced oppositely screw threaded portions, runners threaded on said portions having pins rotatably and slidably confined in longitudinal slots formed in said primary levers, and handle means for turning said operating shaft in one direction to thread said runners in opposite laterally outward directions with respect to said drawbar, thereby moving said primary levers away from each other and retracting said drawbar forwardly, and for turning said shaft in the opposite direction to thread said runners laterally inwardly toward each other, thereby moving said primary levers toward each other and projecting said drawbar rearwardly through said bearing opening.

7. A trailer hitch for an automobile comprising a body adapted to be mounted on the rear of the automobile, said body being formed in its rear end with a bearing opening, a drawbar mounted on said body for forward and rearward endwise movement through said bearing opening, and drawbar operating mechanism on said body comprising two similar sets of toggle means each comprising a pair consisting of a secondary lever and a primary lever, said secondary lever being pivoted at its rear end to the forward end of said drawbar and at its forward end to the rear end of said primary lever and said primary lever having its forward end pivotally anchored to the forward end of said body, a rotary operating shaft mounted transversely on said body in the region of said primary levers, said shaft having axially spaced oppositely screw threaded portions, runners threaded on said portions having pins rotatably and slidably confined in longitudinal slots formed in said primary levers, and handle means for turning said operating shaft in one direction to thread said runners in opposite laterally outward directions with respect to said drawbar, thereby moving said primary levers away from each other and retracting said drawbar forwardly, and for turning said shaft in the opposite direction to thread said runners laterally inwardly toward each other, thereby moving said primary levers toward each other and projecting said drawbar rearwardly through said bearing opening, said primary levers each consisting of a pair of link elements parallelly spaced from each other with the corresponding secondary levers positioned between said link elements.

8. A trailer hitch for an automobile comprising a body adapted to be mounted on the rear of the automobile, said body being formed in its rear end with a bearing opening, a drawbar mounted on said body for forward and rearward endwise movement through said bearing opening, and drawbar operating mechanism on said body comprising two similar sets of toggle means each comprising a pair consisting of a secondary lever and a primary lever, said secondary lever being pivoted at its rear end to the forward end of said drawbar and at its forward end to the rear end of said primary lever and said primary lever having its forward end pivotally anchored to the forward end of said body, a rotary operating shaft mounted transversely on said body in the region of said primary levers, said shaft having axially spaced oppositely screw threaded portions, runners threaded on said portions having pins rotatably and slidably confined in longitudinal slots formed in said primary levers, and handle means for turning said operating shaft in one direction to thread said runners in opposite laterally outward directions with respect to said drawbar, thereby moving said primary levers away from each other and retracting said drawbar forwardly, and for turning said shaft in the opposite direction to thread said runners laterally inwardly toward each other, thereby moving said primary levers toward each other and projecting said drawbar rearwardly through said bearing opening, said operating shaft being adapted to be operated in the last mentioned direction so as to bring said primary and secondary levers of each set into longitudinal alignment with each other and with said drawbar, whereby forward thrusts and rearward pulls imposed upon said drawbar by a trailer connected thereto are exerted in a straight line through said body.

9. A trailer hitch for an automobile comprising a body adapted to be mounted on the rear of the automobile, said body being formed in its rear end with a bearing opening, a drawbar mounted on said body for forward and rearward endwise movement through said bearing opening, and drawbar operating mechanism on said body comprising two similar sets of toggle means each comprising a pair consisting of a secondary lever and a primary lever, said secondary lever being pivoted at its rear end to the forward end of said drawbar and at its forward end to the rear end of said primary lever and said primary lever having its forward end pivotally anchored to the forward end of said body, a rotary operating shaft mounted transversely on said body in the region of said primary levers, said shaft having axially spaced oppositely screw threaded portions, runners threaded on said portions having pins rotatably and slidably confined in longitudinal slots formed in said primary levers, and handle means for turning said operating shaft in one direction to thread said runners in opposite laterally outward directions with respect to said drawbar, thereby moving said primary levers away from each other and retracting said drawbar forwardly, and for turning said shaft in the opposite direction to thread said runners laterally inwardly toward each other, thereby moving said primary levers toward each other and projecting said drawbar rearwardly through said bearing opening, said primary and secondary levers being arranged and proportioned to permit operation of said operating shaft in the last mentioned direction until said primary and secondary levers of the two sets of toggle means come into mutually supporting lateral contact, and said primary and secondary levers of each set are in longitudinal alignment with respect to each other and with respect to said drawbar.

10. A trailer hitch for an automobile having a rear chassis cross member, a rear bumper spaced therefrom, and a splash pan bridging the space between said rear chassis cross member and said rear bumper and secured to the upper part of said bumper, said trailer hitch comprising a body interposed between said cross member and said bumper beneath and protectively covered by said splash pan, said body being anchored at its forward end to said cross member and having an upright on its rear end secured to said bumper (beneath said splash pan), said body being formed in its rear end with a bearing opening beneath said bumper, a drawbar supported on said body for forward and rearward movement through said bearing opening, and operating means on said body connected to said drawbar for forwardly retracting said drawbar into said body and under said splash pan so as not to extend rearwardly beyond said bumper and for rearwardly projecting said drawbar so as to extend beyond said bumper.

KLON SUMMERS.

REFERENCES CITED

The following references are of record in the file of this patent:

UNITED STATES PATENTS

| Number | Name | Date |
|---|---|---|
| 2,097,006 | Weis | Oct. 26, 1937 |
| 2,425,838 | Schultz | Aug. 19, 1947 |